No. 701,547. Patented June 3, 1902.
J. T. DAVIS.
WELL BORING APPARATUS.
(Application filed Apr. 3, 1901.)
(No Model.)
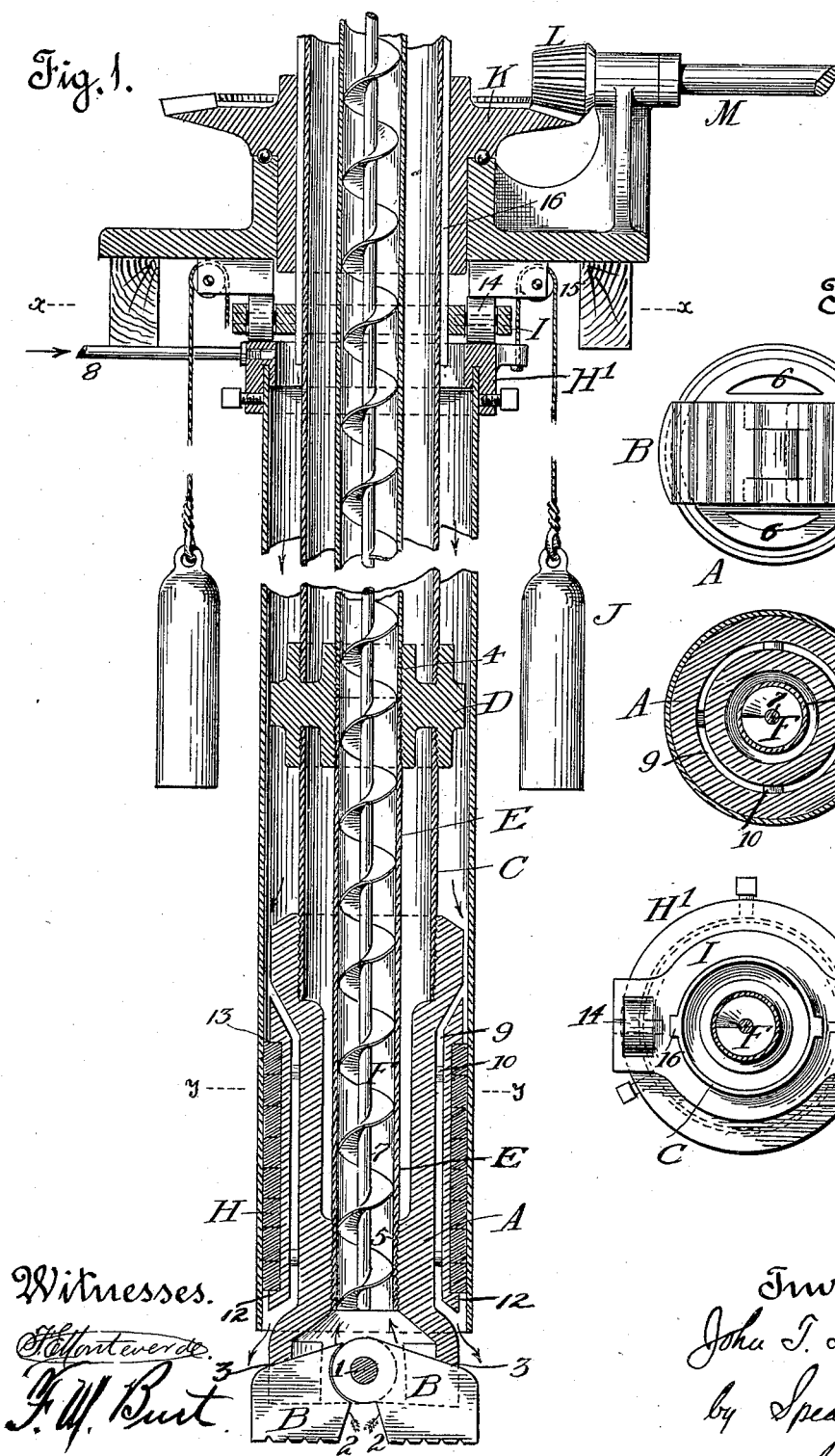
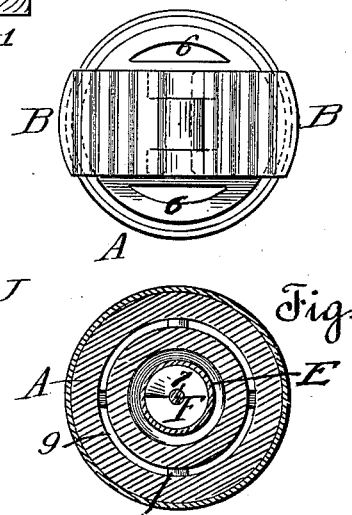
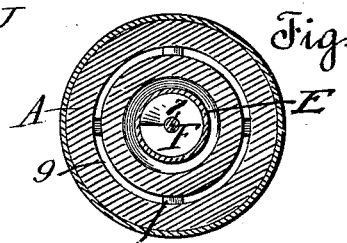
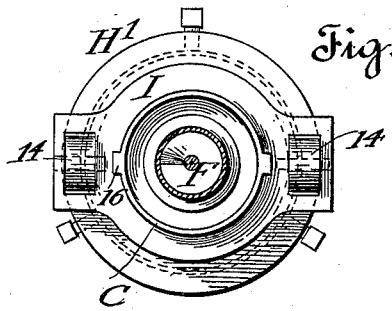
Witnesses.
Inventor.
John T. Davis
by Spear Sealy
Attorneys

UNITED STATES PATENT OFFICE.

JOHN T. DAVIS, OF SAN FRANCISCO, CALIFORNIA.

WELL-BORING APPARATUS.

SPECIFICATION forming part of Letters Patent No. 701,547, dated June 3, 1902.

Application filed April 3, 1901. Serial No. 54,166. (No model.)

*To all whom it may concern:*

Be it known that I, JOHN T. DAVIS, a citizen of the United States, residing at San Francisco, in the county of San Francisco and State of California, have invented certain new and useful Improvements in Well-Boring Apparatus, of which the following is a specification.

My invention relates to well-boring apparatus.

My object is to provide more effective means for positively removing the drillings, to render it easy to insert new sections of casing and new sections of drill-rod as the work proceeds, to provide an improved form of boring-tool operating by grinding action as distinguished from cutting action, to furnish novel means of communicating power to a drill-rod section which is vertically movable in both directions. These objects are attained by a mechanism in which I have embodied my invention and which is fully hereinafter described and is shown in the accompanying drawings.

Figure 1 is a vertical section. Fig. 2 is a cross-section on the line $xx$ of Fig. 1. Fig. 3 is a cross-section on the line $yy$ of Fig. 1. Fig. 4 is a bottom plan of the grinding-bits.

The apparatus shown in Fig. 1 is broken to indicate an indefinite length. In operation such length is increased as the ground is penetrated.

A represents a hollow drill-head, the bore of which is somewhat expanded at the bottom. Within the expanded portion is a pin 1, upon which are pivoted the grinding-bits B B, which project through opposite slots in the drill-head. The bits are free to fall by gravity if unopposed and are oppositely and respectively beveled at 2 2, so that they can approach one another when lifted, and so contract their diameter sufficiently to enable them to be withdrawn from the well. In the opposite direction, however, the upper edges 3 of the guide-slots act as stops and prevent them from expanding. The bits are of substantially rectangular shape in bottom plan, Fig. 4, having, however, curved edges which are arcs of the circular bore of the well. The bits are ribbed or corrugated upon their lower surfaces, which are in contact with the ground by their own gravity and the weight of the drill-rod which drives them. By suitable mechanism they are revolved, acting as one tool, and penetrate the earth by a grinding action and not by a cutting action. To make this grinding action effective, they should be made of exceedingly hard and durable material, and I therefore prefer to construct them of some special natural or artificial substance of exceeding hardness—such, for instance, as natural black diamond or the artificial silicide of carbon known as "carborundum." Grains of either the natural or artificial substance can be mixed with a suitable cementing composition and can be pressed into the desired shapes, the pressure being equal to or greater than the estimated possible weight of the drill-rod or other means employed for communicating power, so as to resist any possible crushing strain.

The drill-rod is a tube C, composed of any number of sections. The lower section is threaded into the drill-head, and adjacent sections are connected by the hollow couplings D, having interior threads 4 at each end, as often as the progress of the work makes it necessary to lengthen the drill-tube.

In order to remove the drillings as fast as the work progresses, an inner tube E is connected to the drill-head by a screw-joint 5. Openings 6 in the bottom of the drill-head, Fig. 4, allow the drillings to pass upwardly. Within the inner tube is a sectional conveyer-flight F, which may surround a vertical rod 7, or in order to save weight each flight-section can be secured to the inclosing section of inner tubing without using such a rod. This conveyer delivers all cuttings to the top of the well. To facilitate this delivery, a stream of water entering at the top through a supply-pipe S is forced down to the bottom between the drill-rod and the well-casing G and at the bottom rises through the openings in the drill-head and into the conveyer, producing a complete circulation of water. The drill-head is formed with an annular water-passage 9, so that the downflow of water is separated from the upflow, and is cast with strengthening lugs or webs 10. The outer well-casing is protected from any grinding action by the drill-head, and the latter is kept centered by a packing H, composed, preferably, of sectional rings, which are held between shoulders 12 13 of the drill-head and the well-casing. This packing also prevents the entrance of Artesian water or seepage up between the inner and outer tubes. In order to make the hole sufficiently large to admit of the outside well-casing going down as fast as the hole is sunk, the bits or blocks B B are made somewhat larger than the outside diameter of the well-casing, as shown in Fig. 1.

On the upper end of the well-casing G is fitted and removably secured a shoe H', having a flat upper surface which forms a track for the rollers 14. These rollers are mounted loosely on pins in the band or collar I, which surrounds and is secured to the drill-tubing. As the drill-tubing descends with the progess of the work the outside casing descends also. This lowering motion is, however, regulated by counterweights J, suspended from the shoe H' by cables passing over pulleys 15, which prevent the casing from dropping upon the drill-bits and preserve the proper relative distance between the bottom of the casing and the said bits.

Power is applied to the tubular drill-rod, to the drill-bits secured thereto, and to the conveyer inclosed thereby by a bevel-gear K, mounted upon any suitable framing structure and deriving motion from a pinion L and shaft M. One section of tubular drill-rod has exterior feathers 16, which engage with grooves in the bevel-gear loosely enough to permit the free descent of the drill-rod, but still compel its rotation. When this feathered section has gone down sufficiently to make the insertion of another section necessary, it is unscrewed from the drill-head or from one of the couplings D, as the case may be, and then lifted up to a sufficient height to enable another section of outside casing to be inserted and connected. This is continually repeated as the work proceeds, producing a progressively-increasing length of rotary tubular sections carrying internal conveyer-flights and all firmly connected by the flanged and socketed couplings D. It will be understood from this description that the upper or feathered section only descends for its own length or less, is then raised without requiring the removal of any part of the apparatus, and is reconnected to an inserted section and in turn to as many succeeding inserted sections as the depth of the well requires.

I do not limit myself to the exact constructions described, and shown in the drawings, as I desire to avail myself of such modifications and equivalents as fall properly within the spirit of my invention.

Having thus fully described my invention, what I claim as new, and desire to secure by Letters Patent, is—

1. In a well-boring apparatus, a well-casing, a hollow boring-tube therein composed of sections, a boring-head carried by said tube, a conveyer-flight and sectional conveyer-tube within the boring-tube, a gear-wheel connected by a feather and groove with the upper section of the boring-tube and means whereby sections may be interposed in the boring-tube and conveyer-tube consisting of the coupling D having a central bore to receive the sections of the conveyer-tube and annular internally-threaded sockets opening upwardly and downwardly to receive the boring-tube sections, substantially as described.

2. In a well-boring apparatus, the upper section of well-casing, a shoe mounted thereon, and having a circular track, an upper section of drill-rod tubing, rollers carried thereby and traveling upon said track, a gear-wheel held against vertical movement with the drill-tube and the well-casing having a feathered and grooved communication with said section of drill-tubing, whereby said upper sections of well-casing and of drill-tubing are permitted to move vertically in both directions, and means for holding the well-casing with its shoe up against the said rollers.

3. In a well-boring apparatus, a driving-gear, a section of drill-rod feathered therein, a collar secured to said section and having rollers, a section of well-casing, a circular track supported thereby, a driving-shaft and counterbalance means connected with the well-casing to hold it with its circular track up against the rollers carried by the drill-rod; whereby the said well-casing and drill-rod can sink automatically as the boring progresses, and can also be raised to permit of the insertion of successive lower sections, said driving-gear being held against vertical movement with the drill-rod and well-casing.

In testimony whereof I have affixed my signature, in presence of two witnesses, this 23d day of March, 1901.

JOHN T. DAVIS.

Witnesses:
L. W. SEELY,
F. M. BURT.